United States Patent [19]

Ohgida et al.

[11] 4,051,975
[45] Oct. 4, 1977

[54] CAP FOR FUEL TANK

[75] Inventors: Hidetoshi Ohgida; Yoshiharu Sakai, both of Atsugi; Hiroyuki Kawai, Tokyo, all of Japan

[73] Assignee: Nihon Radiator Co., Ltd., Tokyo, Japan

[21] Appl. No.: 778,849

[22] Filed: Mar. 18, 1977

[30] Foreign Application Priority Data

Mar. 25, 1976 Japan .......................... 51-35186[U]

[51] Int. Cl.$^2$ ............................................. B65D 51/16
[52] U.S. Cl. .................................. 220/203; 220/303; 220/DIG. 33
[58] Field of Search ............... 220/203, 209, 303, 367, 220/DIG. 32, DIG. 33; 137/43, 533.11, 533.15, 493, 493.6, 526

[56] References Cited

U.S. PATENT DOCUMENTS

| 3,724,707 | 4/1973 | Burgess | 220/203 |
| 3,938,692 | 2/1976 | Crute | 220/203 |

Primary Examiner—George T. Hall
Attorney, Agent, or Firm—Gordon W. Hueschen

[57] ABSTRACT

A cap of a fuel tank comprising a lid member constructed of upper and lower plates to form a passage communicated with the air between both plates, a seating plate underlying said lid member and provided with a plurality of bores circularly arranged in the peripheral portion of the central flat field thereof, a diaphragm of a flexible material underlying said seating plate and provided with a perforation in the central portion thereof and an annular ridge surrounding the perforation on the upside thereof, a valve plate underlying said diaphragm and provided with a perforation in register with the perforation of said diaphragm, a casing disposed at the lowest position in the cap and provided with a perforation in the bottom thereof, the peripheral portion of said diaphragm being fixedly interposed between the peripheral portion or said lower plate with intermediation of said seating plate and the flange portion of said casing, and a coil spring held in said casing and adapted to urge said valve plate upwardly.

8 Claims, 5 Drawing Figures

CAP FOR FUEL TANK

The present invention relates to a closure cap and, more particularly to a closure cap for a pouring inlet of an automobile gasoline tank.

Recently in view of protection against air pollution and accidents, caps for an automobile fuel tank are designed to prevent fuel such as gasoline or the like and gases evaporated from it from escaping out of the tank. For instance, referring to FIG. 1, such a known cap is described. A lid member 1 is constructed of upper and lower plates 1a and 1b superposed on each other to form a central chamber 2 between them. The upper plate 1a has a plateau or plateaus in its peripheral portion to form a passage 3 communicating with the outside. A cylindrical member 4 provided with a bore 5 is fitted in the chamber 2. At the lower end of the cylindrical member 4, a ring packing 6 is disposed separately from or as an integral part of it. To the underside of the lid member 1 is secured a cylindrical casing 8 in which a coil spring 9 and a loosely inserted valve body 7 normally pressed on the packing above by the spring 9 are held. According to the abovementioned construction, normally the valve body 7 is forced to be pressed on the packing 6 by the action of the spring 9 to prevent harmful gases evolved in the tank, such as vapor of gasoline from escaping. When fuel in the tank gets low by consumption, the resultant reduction of the inside pressure of the tank causes the valve body 7 to move down away from the packing 6 to form a gap between them. In this way an air path from the outside through the passage 3, chamber 2, bore 5, the interior of the cylindrical member 4, the gap between the packing 6 and the valve body 7, another gap between the valve body 7 and the cylindrical casing 8, and finally bore 10 is completed. As the result, air flows into the fuel tank.

The known cap mentioned above, however, has a disadvantage of being incapable to make the valve body 7 have an area subject to pressure sufficiently large for complete sealing between the valve body 7 and the packing 6. For this reason, it is impossible to throughly prevent vapor of fuel and fuel itself from escaping out of the fuel tank by such as shaking of an automobile body or shock in a collision. In such a case, there is in much danger of causing a fire by fuel, such as gasoline, escaped through the cap. Another disadvantage of the known cap is the fact that a set pressure for opening and closing the valve body 7 tends to fluctuate. This may make it impossible to supply fuel from the tank to the engine during operation, or in an extreme case results in damage of the fuel tank.

An object of the present invention is to provide an improved closure cap.

Another object of the present invention is to provide a tight sealing cap for a fuel tank.

These objects are accomplished according to the present invention by the provision of a cap for a fuel tank comprising a lid member constructed of upper and lower plates to form a passage communicated with the air between both plates, a seating plate underlying said lid member and provided with a plurality of bores circularly arranged in the peripheral portion of the central flat field thereof, a diaphragm of a flexible material underlying said seating plate and provided with a perforation in the central portion thereof and an annular ridge surrounding the perforation on the upside thereof, a valve plate underlying said diaphragm and provided with a perforation in register with the perforation of said diaphragm, a casing disposed at the lowest position in the cap and provided with a perforation in the bottom thereof, the peripheral portion of said diaphragm being fixedly interposed between the peripheral portion of said lower plate with intermediation of said seating plate and the flange portion of said casing, and a coil spring held in said casing and adapted to urge said valve plate upwardly.

A cap for a fuel tank in accordance with the present invention has reliable operation and very high sealing effect because of fitting a diaphragm in it.

The present invention will be understood best in connection with the accompanying drawings wherein.

Figure 1:
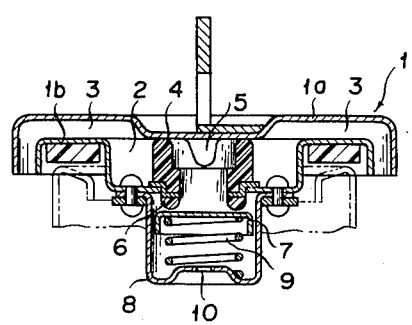
FIG. 1 is a sectional view of a conventional cap for a fuel tank.
Figure 2:
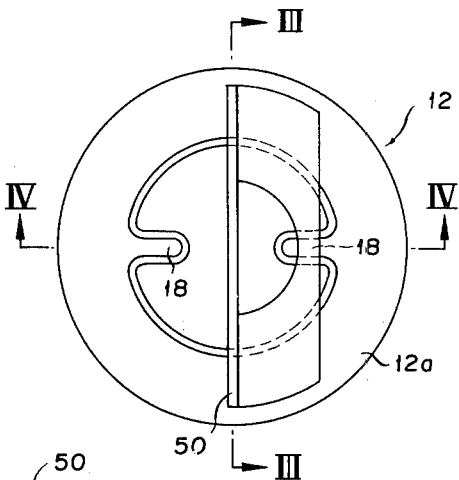
FIG. 2 is a plan view of a cap for a fuel tank in accordance with the present invention.
Figure 3:
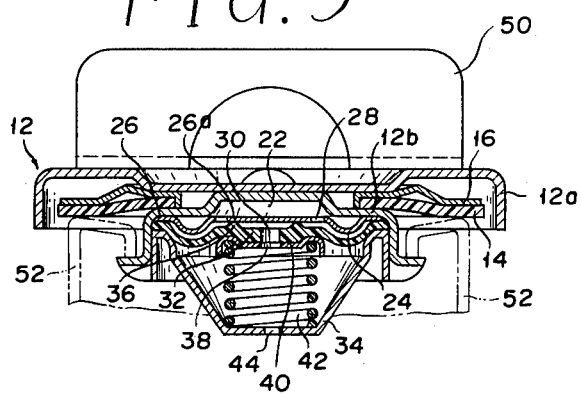
FIG. 3 is a sectional view taken along the line III—III of FIG. 2.
Figure 5:
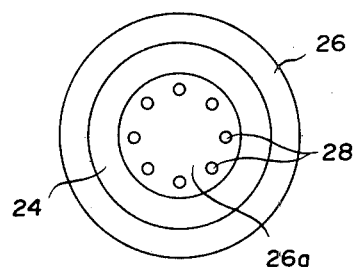
FIG. 5 is a bottom view of the seating plate seen in FIG. 2.
Figure 4:
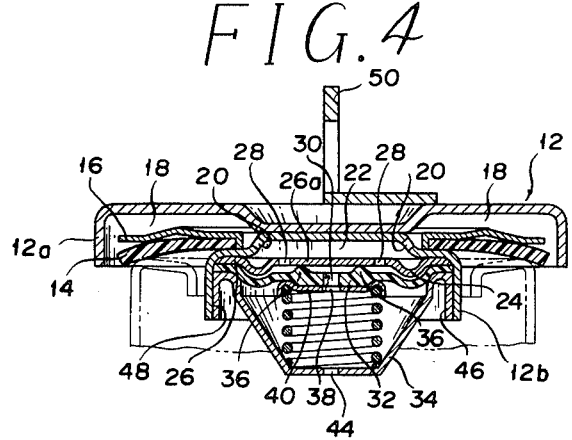
FIG. 4 is a sectional view taken along the line IV-IV of FIG. 2.

In FIGS. 2 to 4 illustrating a cap for a fuel tank in accordance with the present invention, a lid member 12 comprising upper and lower plates 12a and 12b fixedly secured to each other with their central portions. Between their peripheral portions, an annular packing 14 of flexible material such as rubber and an annular flat spring 16 urging downwardly the packing 14 are interposed. The upper plate 12a has plateau or plateaus, thereby an air passage 18 being formed between the upper plate 12a and the flat spring 16. The lower plate 12b is provided with a perforation 20 connected to the passage 18. Accordingly outside air can flow through the passage 18 and the perforation 20 into a chamber 22 located under the lower plate 12b. Under the lower plate 12b a seating plate 26 is disposed. The seating plate is provided with an annular recess 24 and, as shown in FIG. 5, a plurality of bores in the peripheral portion of the central flat field 26a. Under the seating plate 26, a diaphragm 32 of a flexible material such as provided with a central perforation 30 is disposed. The diaphragm 32 has substantially the same shape as that of the seating plate 26 except that an annular ridge 36 is formed in the surroundings of the central perforation 30, and is supported by the fixed interposition of its peripheral portion between the lower plate 12b of the lid member with intermediation of the seating plate 26 and the flange of an underdescribed casing 34. Under the diaphragm 32, a valve plate 40 provided with a central perforation 38 in register with the central perforation 30 of the diaphragm 32 is disposed to permit coming into and out of engagement with the diaphragm 32. A coil spring 42 disposed between the valve plate 40 and the bottom of the casing 24 always urges the diaphragm 32 towards the underside of the seating plate 26. The valve member 40 has a peripheral skirt for grasping the spring 42. The casing 34 is formed as a cup-like shape with a flange and a skirt 46 extending downwardly from the flange and provided with a perforation in the bottom. The skirt 46 of the casing 34 is fixedly secured with calks to the skirt 48 of the lower plate 12b in engagement with the inner face of the latter skirt so that the seating plate 26 and the diaphragm 32 are firmly clamped between the casing 34 and the lower plate 12b. Furthermore, the lid member 12 has a handle on its upside.

When the cap in accordance with the present invention is, for instance, attached to the annular supplying inlet 52 of an automobile fuel tank, the diaphragm 32 is normally pressed on the underside of the seating plate 26 through the valve plate 40 by the actions of the spring 42. The ridge 36 on the upside of the diaphragm 32 then is pressed on the underside of the flat portion 26a to seal air — and -liquid — tightly between the interior of the casing 34 and chamber 22. Thereby noxious evolved gases such as gasoline, etc. are prevented from escaping out of the tank.

When fuel in the tank gets low, a nagative pressure is generated in the tank. Then air entering from the outside through the passage 18, and the perforation 20 in the chamber 22 flows through the perforation 28 of the seating plate 26 into the space between the seating plate 26 and diaphragm 32. As the result, the diaphragm is subjected to downward power on a large area, and moves down against the power of the spring 42. The air in the abovementioned space then flows through the perforations 30 and 38 into the casing 34, and through the perforation 44 into the interior of the tank. Thus the pressure in the tank can be compensated. It is noteworthy that the diaphragm 32, of which area subjected to the atmospheric pressure is large, serves to rapidly open the passage of air in response to lowering of the pressure in the tank.

Though enough air can flow through the annular gap into the tank, the gap being formed between the underside of the seating plate 26 and the upside of the diaphragm 32 by the ridge 36, according to a preferred feature, for increasing the flowing of air, a little lower protrusion or radial ridge than the ridge 36 can be provided on the upside of the diaphragm of the seating plate 14 to create small gap between the diaphragm 32 and the underside of the seating plate 26.

When sudden increase of the pressure in a fuel tank is caused for instance by parking in a burning sun, shaking of an automobile, or shock in a collision, the cap in accordance with the present invention displays an exceeding powerful sealing effect on preventing evaporated gases and fuel from escaping or ejecting out of the tank because the diaphragm 32 has a large area subjectable to the power of the spring 42 and to the pressure in the tank, and for this reason the ridge 36 is forcefully pressed on the underside of the seating plate 26.

What is claimed is:

1. A cap of a fuel tank comprising a lid member constructed of upper and lower plates to form a passage communicated with the air between both plates, a seating plate underlying said lid member and provided with a plurality of bores circularly arranged in the peripheral portion of the central flat field thereof, a diaphragm of a flexible material underlying said seating plate and provided with a perforation in the central portion thereof and an annular ridge surrounding the perforation on the upside thereof, a valve plate underlying said diaphragm and provided with a perforation in register with the perforation of said diaphragm, a casing disposed at the lowest position in the cap and provided with a perforation in the bottom thereof, the peripheral portion of said diaphragm being fixedly interposed between the peripheral portion of said lower plate with intermediation of said seating plate and the flange portion of said casing, and a coil spring held in said casing and adapted to urge said valve plate upwardly.

2. A cap according to claim 1, wherein said casing has a flange and a skirt extending from the flange, and the skirt of said casing is fixedly secured with calks to the skirt of said lower plate of said lid member in engagement with the inner face of the latter skirt so that the peripheral edges of the seating plate and the diaphragm are firmly clamped between said casing and said lower plate.

3. A cap according to claim 1, wherein in the surroundings of the central portion of said lid member at which said upper and lower plates are fixedly secured to each other, an annular packing and an annular spring urging downwardly the packing are interposed between both plates.

4. A cap according to claim 1, wherein said seating plate is provided in the surroundings of the central flat field thereof with an annular recess.

5. A cap according to claim 1, wherein said diaphragm is provided in surroundings of said annular ridge thereof with an annular recess.

6. A cap according to claim 1, wherein said diaphragm is made of rubber.

7. A cap according to claim 1, wherein said casing is cup-shaped.

8. A cap according to claim 1, wherein said valve plate has a peripheral skirt for grasping said spring.

* * * * *